US008948174B2

(12) United States Patent
Szyszko et al.

(10) Patent No.: US 8,948,174 B2
(45) Date of Patent: Feb. 3, 2015

(54) VARIABLE-BASED FORWARDING PATH CONSTRUCTION FOR PACKET PROCESSING WITHIN A NETWORK DEVICE

(75) Inventors: Andrzej Szyszko, Holden, MA (US); Apurva Mehta, Cupertino, CA (US); Kumar Mehta, Cupertino, CA (US); Gopi Krishna, Union City, CA (US); Jagadish Grandhi, Mountain View, CA (US); Murtuza Attarwala, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 563 days.

(21) Appl. No.: 13/172,505

(22) Filed: Jun. 29, 2011

(65) Prior Publication Data

US 2013/0003736 A1    Jan. 3, 2013

(51) Int. Cl.
*H04L 12/28*     (2006.01)
*G06F 15/173*    (2006.01)
*H04L 12/851*    (2013.01)

(52) U.S. Cl.
CPC ................................. *H04L 47/2441* (2013.01)
USPC ........................................ 370/392; 709/238

(58) Field of Classification Search
USPC ....................................................... 370/392
See application file for complete search history.

(56) References Cited

U.S. PATENT DOCUMENTS

| 6,535,507 | B1 |   | 3/2003 | Li et al. |
| 6,618,760 | B1 | * | 9/2003 | Aramaki et al. ............. 709/240 |
| 6,859,842 | B1 | * | 2/2005 | Nakamichi et al. .......... 709/238 |
| 6,873,603 | B1 |   | 3/2005 | Ivaturi |
| 7,027,773 | B1 |   | 4/2006 | McMillin |
| 7,231,459 | B2 | * | 6/2007 | Saraph et al. ................. 709/241 |
| 7,649,904 | B1 |   | 1/2010 | Ghosh et al. |
| 7,653,057 | B1 | * | 1/2010 | Fromm et al. ................ 370/389 |
| 7,761,500 | B1 |   | 7/2010 | Eckert et al. |
| 7,948,986 | B1 | * | 5/2011 | Ghosh et al. ................. 370/392 |

(Continued)

FOREIGN PATENT DOCUMENTS

WO      0215469 A2   2/2002

OTHER PUBLICATIONS

International Search Report and Written Opinion of international application No. PCT/US2012/045099, dated Oct. 1, 2012, 12 pp.

(Continued)

*Primary Examiner* — Guang Li
(74) *Attorney, Agent, or Firm* — Shumaker & Sieffert, P.A.

(57) ABSTRACT

In general, this disclosure describes techniques for applying, with a network device, subscriber-specific packet processing using an internal processing path that includes service objects that are commonly applied to multiple packet flows associated with multiple subscribers. In one example, a network device control plane creates subscriber records that include, for respective subscribers, one or more variable values that specify service objects as well as an identifier for a packet processing template. A forwarding plane of the network device receives and maps subscriber packets to an associated subscriber record and then processes the packet by executing the packet processing template specified by the subscriber record. When the forwarding plane reaches a variable while executing the specified packet processing template, the forwarding plane reads the associated variable value from the subscriber record to identify and then apply the subscriber-specific service object specified by the variable.

32 Claims, 5 Drawing Sheets

(56) References Cited

U.S. PATENT DOCUMENTS

| | | | |
|---|---|---|---|
| 7,990,993 B1 | 8/2011 | Ghosh et al. | |
| 8,244,909 B1* | 8/2012 | Hanson et al. | 709/238 |
| 8,295,284 B1* | 10/2012 | Singh et al. | 370/392 |
| 8,520,680 B1* | 8/2013 | Doshi et al. | 370/392 |
| 8,718,057 B1* | 5/2014 | Rabie et al. | 370/390 |
| 2002/0176363 A1* | 11/2002 | Durinovic-Johri et al. | 370/237 |
| 2003/0026268 A1 | 2/2003 | Navas | |
| 2003/0053448 A1* | 3/2003 | Craig et al. | 370/353 |
| 2004/0114595 A1 | 6/2004 | Doukai | |
| 2004/0174825 A1 | 9/2004 | Li et al. | |
| 2004/0243835 A1 | 12/2004 | Terzis et al. | |
| 2005/0068933 A1* | 3/2005 | Kokkonen et al. | 370/349 |
| 2005/0169264 A1* | 8/2005 | Kim et al. | 370/389 |
| 2005/0226201 A1 | 10/2005 | McMillin | |
| 2006/0235995 A1 | 10/2006 | Bhatia et al. | |
| 2007/0028001 A1* | 2/2007 | Phillips et al. | 709/238 |
| 2007/0055789 A1* | 3/2007 | Claise et al. | 709/234 |
| 2007/0206492 A1 | 9/2007 | Zelig et al. | |
| 2007/0297329 A1 | 12/2007 | Park et al. | |
| 2008/0005293 A1* | 1/2008 | Bhargava et al. | 709/223 |
| 2008/0137660 A1* | 6/2008 | Olakangil et al. | 370/392 |
| 2008/0198865 A1 | 8/2008 | Rudnick et al. | |
| 2008/0240106 A1* | 10/2008 | Schlenk | 370/392 |
| 2009/0259734 A1 | 10/2009 | Morikawa | |
| 2009/0310610 A1* | 12/2009 | Sandstrom | 370/392 |
| 2010/0202450 A1* | 8/2010 | Ansari et al. | 370/389 |
| 2012/0027015 A1* | 2/2012 | Carney et al. | 370/392 |

OTHER PUBLICATIONS

International Preliminary Report on Patentability from international application No. PCT/US2012/045099, dated Jan. 16, 2014, 8 pp.

* cited by examiner

VARIABLE-BASED FORWARDING PATH CONSTRUCTION FOR PACKET PROCESSING WITHIN A NETWORK DEVICE

TECHNICAL FIELD

The invention relates to packet-based computer networks and, more particularly, to forwarding packets within computer networks.

BACKGROUND

A network service provider offers services to subscribers that access a service provider core network using an access network. Services offered may include, for example, traditional Internet access, Voice-over-Internet Protocol (VoIP), video and multimedia services, and security services. The service provider network may support multiple types of access network infrastructures that connect to service provider network access gateways to provide access to the offered services.

Because the access gateways are positioned near the edge of the service provider network directly upstream from the subscribers and operate to provide an operational endpoint (i.e., terminate) the subscriber connections (e.g., digital subscriber line- or cable-based connections) into the service provider network, the access gateways typically provide mechanisms for identifying subscriber traffic and providing subscriber-specific services. The access gateways apply subscriber policies to manage subscriber traffic on a per-subscriber basis as such traffic traverses the service provider core network boundary.

Network devices, such as access gateways, often include a control unit that provides control plane functionality for the network device. In some cases, the network devices may also include a plurality of forwarding components, such as packet forwarding engines (PFEs), and a switch fabric that collectively provide a forwarding plane for forwarding network traffic.

The control plane functions provided by the control unit include storing network topologies in the form of routing tables, executing routing protocols to communicate with peer routing devices to maintain and update the routing tables, and providing a management interface to allow user access and configuration of the network device. The control unit maintains routing information that represents the overall topology of the network and defines routes to destination prefixes within the network.

The control unit derives a forwarding information base (FIB) that includes a number of service objects generated and/or allocated by the control unit in accordance with the routing information and control information and installs the service objects to the forwarding components. The data and instructions that constitute the service objects define an internal processing and forwarding path for each incoming packet received by the network device. For example, to generate a route table lookup service object, the control unit selects routes defined by the network topology and maps packet key information (e.g., destination information and other select information from a packet header) to one or more specific next hop network devices and ultimately to one or more specific output interfaces of interface cards of the network device. Typically, the control unit installs the service objects into each of the forwarding components to update the FIB and control traffic processing and forwarding within the forwarding plane. Bifurcating control and forwarding plane functionality allows the FIB in each of forwarding components to be updated without degrading packet forwarding performance of the network device.

SUMMARY

In general, this disclosure describes techniques for applying, with a network device, subscriber-specific packet processing using an internal processing path that includes service objects that are commonly applied to multiple packet flows associated with multiple subscribers. In one example, a control plane of a network device manages subscribers to identify subscriber-specific services and service attributes for each of the subscribers. The control plane further identifies services and service attributes that are common to multiple subscribers and that may be applied using a common service object of an internal processing path of the network device forwarding plane.

The control plane directs the forwarding plane to create and install, to the internal processing path, packet processing templates for respective sets of subscribers that share services. The packet processing templates include a number of service objects that apply forwarding, filtering, rate-limiting, queuing, accounting, and/or other services that may be applied in common to the respective sets of subscribers. In addition, each packet processing template specifies one or more variables, the value for which may be later determined "in-flight," that is, while processing a packet in the forwarding plane using the template. The control plane creates and installs within the internal processing path subscriber records that specify, for respective subscribers, one or more variable values as well as an identifier for a packet processing template. The variable values may identify, for example, a particular service object installed to the internal processing path or an attribute value that determines an aspect of the service object functionality.

The forwarding plane receives and maps subscriber packets to an associated subscriber record for the subscriber and then processes the packet within the internal processing path using the packet processing template specified by the subscriber record. When the forwarding plane reaches a variable while executing the specified packet processing template, the forwarding plane reads the associated variable value from the subscriber record to identify and then apply the subscriber-specific service operation or attribute value for the variable. Subscriber record variable values may in this way alter the execution path of the packet processing template based on the identity of the subscriber rather than upon the packet key, which may be overloaded among multiple subscribers.

The techniques may provide one or more advantages. For example, the techniques allow the control plane to create and modify an internal processing path in the forwarding plane for subscriber packets using a simple data structure: a subscriber record. In other words, having created and installed a packet processing template for a set of subscribers, the control plane may map traffic of any number of additional subscribers to the packet processing template by creating corresponding subscriber records that identify the packet processing template and include subscriber-specific variable values. As a result, the forwarding plane may apply a common internal processing path to multiple subscriber flows while still providing subscriber-specific processing as needed. This may increase the scalability of the network device in both the number of subscribers and number of services dimensions by reducing both the setup time and the amount of processing path resources required to support each subscriber.

In one example, a method comprises installing, to a forwarding plane of a network device, a packet processing template that specifies a common service to apply to a plurality of packet flows during packet processing with the packet processing template and a variable that determines execution paths associated with the packet processing template. The method also comprises generating, for a first packet flow of the plurality of packet flows, a first subscriber record that specifies a first variable value for the variable. The method further comprises receiving, with the network device, a first packet associated with the first packet flow. The method further comprises processing the first packet with the packet processing template by using the first variable value specified by the first subscriber record to select, for the first packet, an execution path associated with the packet processing template.

In another example, a network device comprises an interface card, a control unit comprising one or more processors, and a forwarding component associated with the interface card. The forwarding component comprises a key engine, a packet processing template that specifies a common service to apply to a plurality of packet flows during packet processing with the packet processing template and a variable that determines execution paths associated with the packet processing template. The forwarding component also comprises a first subscriber record that specifies a first variable value for the variable, wherein the first subscriber record is associated with a first packet flow of the plurality of packet flows, wherein the interface card receives a first packet associated the first packet flow, and wherein the key engine executes the packet processing template by using the first variable value specified by the first subscriber record to select, for the first packet, an execution path associated with the packet processing template.

In another example, a non-transitory computer-readable medium contains instructions. The instructions cause one or more programmable processors to install, to a forwarding plane of a network device, a packet processing template that specifies a common service to apply to a plurality of packet flows during packet processing with the packet processing template and a variable that determines execution paths associated with the packet processing template. The instructions also cause the one or more programmable processors to generate, for a first packet flow of the plurality of packet flows, a first subscriber record that specifies a first variable value for the variable. The instructions also cause the one or more programmable processors to receive, with the network device, a first packet associated with the first packet flow. The instructions also cause the one or more programmable processors to process the first packet with the packet processing template by using the first variable value specified by the first subscriber record to select, for the first packet, an execution path associated with the packet processing template.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
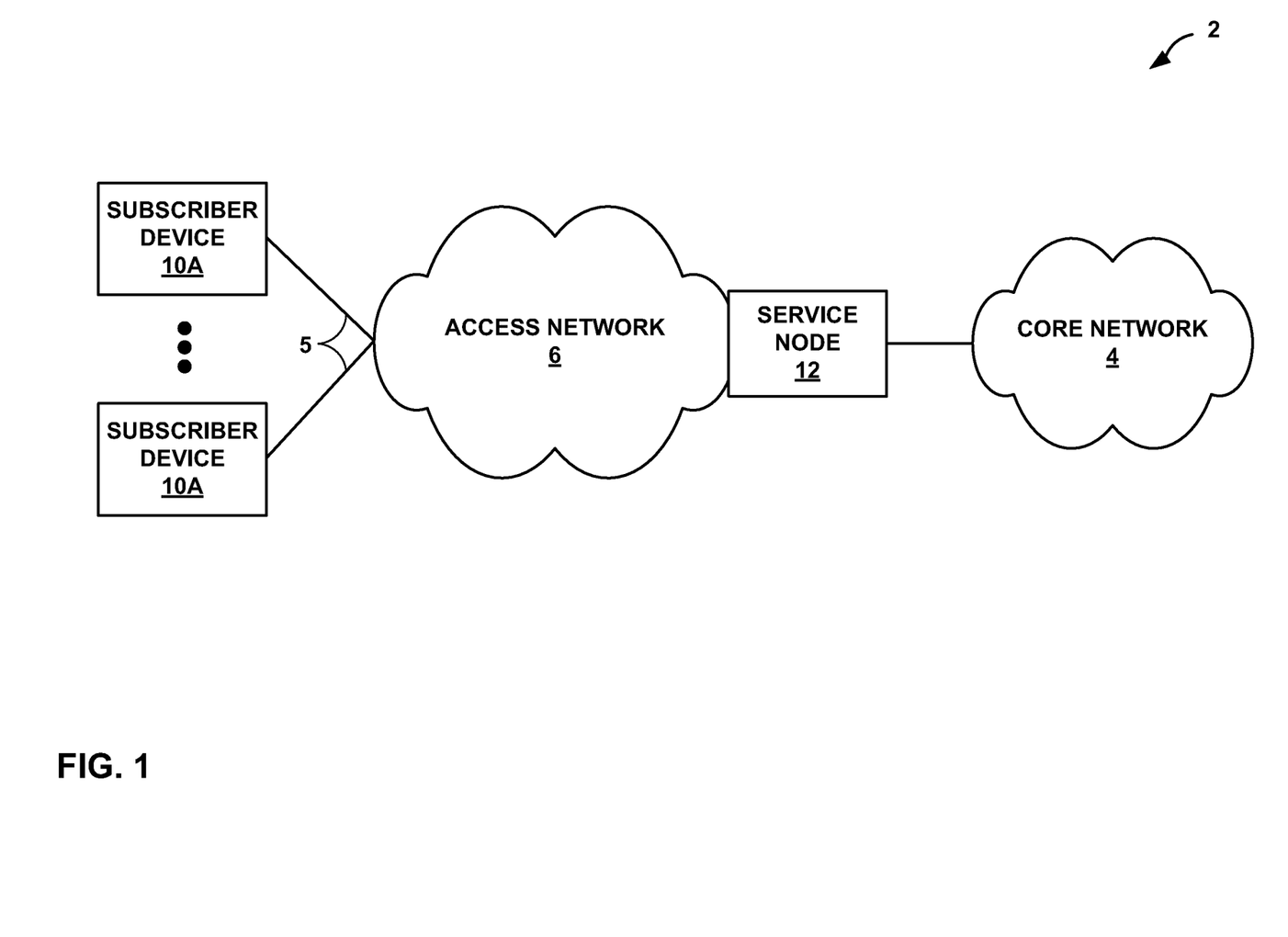
FIG. 1 is a block diagram illustrating an example network system in which a service node uses a variable-based forwarding architecture to apply services to network data traffic between an access network and a core network.

FIG. 1 is a block diagram illustrating an example network system 2 in which service node 12 uses a variable-based forwarding architecture to apply services to network data traffic between access network 6 and core network 4. Service node 12 is upstream (i.e., core side) of access network 6 and provides components necessary for receiving and terminating subscriber-specific connections so as to produce packet-based communications.

Subscriber devices 10A-10N ("subscriber devices 10") attach to SP network 2 via access network 6 to obtain services offered by SP network 2 to subscribers. Subscriber devices 10 may each comprise, for example, a mobile phone, a smart phone, a desktop/laptop computer, a gaming console, a video-conferencing suite, a workstation, a wireless device, a network-ready appliance, a file server, print server, a digital subscriber line (DSL) router, a cable modem, or another device with which to access services of SP network 2. A subscriber may represent, for instance, an enterprise, a residential subscriber, or a mobile subscriber. Subscriber devices 10 connect to access network 6 via access links 5 that may each comprise wired and/or wireless communication links. The term "communication link," as used herein, comprises any form of transport medium, wired or wireless, and can include intermediate nodes such as network devices. Each of access links 5 may include, for instance, aspects of an asymmetric DSL network, WiMAX, a T-1 line, an Integrated Service Digital Network (ISDN), or wired Ethernet.

Access network 6 aggregates data traffic from one or more subscribers for transport to/from core network 4 of SP network 2. Access network 6 includes network nodes (not shown in FIG. 1) that execute communication protocols to transport control and user data to facilitate communication between subscriber devices 10 and core network 4. Access network 6 may comprise, for example, digital subscriber line access multiplexers (DSLAMs), switches, edge routers, broadband remote access servers (BRAS), a gateway general packet radio service (GPRS) support node (GGSN) and other GPRS support node (GSNs), a Universal Mobile Telephone System (UMTS) having a UMTS Terrestrial Radio Access Network (UTRAN), and/or a 3GPP Long Term Evolution (LTE) mobile access network employing, for instance, service gateways (SGWs), packet data network gateways (PDNs), and eNodeBs, a mobile IP network, an IP network, or another type of network that provides access for subscribers 10 to core network 4. The elements of access network 6 may support a variety of protocols, such as Internet Protocol (IP), Frame Relay, Asynchronous Transfer Mode (ATM), Ethernet, Point-to-Point Protocol (PPP), Point-to-Point Protocol over Ethernet (PPPoE), GPRS tunneling protocol (GTP), and virtual local area network (VLAN)-related protocols, among others. Subscriber devices 10 may each have a dedicated subscriber interface, e.g., an ATM virtual circuit (VC) or an Ethernet virtual local area network (VLAN), to access network 6.

Core network 4 may represent a public network that is owned and operated by a service provider to interconnect a plurality of networks, such as access network 6. Core network 4 may implement Multi-Protocol Label Switching (MPLS) forwarding and in such instances may be referred to as an MPLS network. In some instances, core network 4 represents a plurality of interconnected autonomous systems, such as the Internet, that offers services from one or more service providers.

In some instances, transport links couple service node 12 to access network 6 and core network 4. Service nodes 12 may be considered as located "behind" the access network. All network traffic exchanged between access network 6 and core network 4 traverses service node 12. Service node 12 may constitute a part of a backhaul network, which may include land-based transmission lines, frequently leased by a service provider, to transport data and control traffic between access network 6 and core network 4. The backhaul network typically also includes switches, aggregation devices, and routers. Service node 12 may comprise a network edge or core router that routes network packets to/from access network 6, or service node 12 may comprise an intermediate network device that transports packets between access network 6 and core network 4. In some embodiments, service node 12 comprises an MX-series router manufactured by Juniper Networks, Inc., of Sunnyvale, Calif. Various embodiments of SP network 2 may include additional service nodes.

Service node 12 may also represent an access gateway, a layer three network edge device that manages subscriber attachment sessions and routes subscriber data traffic to/from core network 4. In such instances, service node 12 authenticates or receives authentication for subscriber device 10, authorizes the devices to access core network 4, and may provide network configuration information to the devices. When one of subscriber devices 10 attempt to attach to core network 4, service node 12 may authenticate the device by interfacing to a server using a AAA protocol, such as Remote Authentication Dial-In User Service (RADIUS) or the Diameter protocol, to authenticate the subscriber device or a user thereof. Service node 12 in such instances may comprise, for example, a GGSN, an edge router such as a BRAS, a CMTS, or another network device.

In some embodiments, service node 12 comprises a switching device that forwards layer two (L2) traffic based on, for example, MAC layer addresses. L2 traffic may include Ethernet frames addressable by MAC layer addresses that may be used, in accordance with the techniques described herein, to identify a subscriber or subscriber class.

A network service provider that administers SP network 2 offers services on a per-subscriber basis to subscriber devices 10 that access the service provider network. Services offered may include, for example, traditional Internet access, Voice-over-Internet Protocol (VoIP), video and multimedia services, and security services. The network service provider may configure SP network 2 to offer services to subscribers in accordance with one or more service level agreements (SLAs) that define network performance levels in a number of dimensions, including the type of offered services and corresponding service parameters (e.g., upstream/downstream bandwidth, reliability (e.g., up-time), security, quality of service, rate limits, and others). In this way, SLAs or other service agreements may govern communication between SP network 2 and subscriber devices 16.

Any one of subscriber devices 10 may begin exchanging data packets with core network 4, and such packets traverse service node 12 as members of at least one packet flow. The term "packet flow" refers to a set of packets originating from a particular source device and sent to a particular destination device as part of an application communication session between the source and destination device. A flow of packets, in either the upstream (sourced by subscriber devices 10) or downstream (destined for subscriber devices 10) direction, may be identified by the five-tuple: <source network address, destination network address, source port, destination port, protocol>. This five-tuple generally identifies a packet flow to which a received packet corresponds and, depending on the flow direction, a subscriber may be associated with either the source network address or the destination network address of the flow. In some instances, access network 6 may overload the five-tuple or a subset thereof with packet flows for multiple different subscribers and/or with multiple packet flows for the same subscriber. For example, subscriber device 10A may establish multiple traffic bearers to service node 12 each having distinct QoS parameters that correspond with the service being born, e.g., VoIP or bulk data transfer. Packet flows may therefore also be characterized and identified according to other characteristics, including VLAN tags, PPPoE session, and GTP tunnel identifiers of network layer or data link layer protocol headers/tags that encapsulate the packets. Service node 12 may identify an application using deep packet inspection (DPI).

Service node 12 differentially process subscriber data traffic packets based on packet flow requirements for a subscriber packet flow by applying configurable packet processing operations, including packet forwarding, filtering, rate limiting, marking, accounting, policy-based routing and redirection, advertisement insertion, lawful intercept, class of service, and traffic shaping, for instance, to subscriber traffic exchanged with subscriber devices 10. That is, service node 12 receives values for configurable parameters for subscribers and/or associated subscriber flows and internally schedules packets and otherwise processes the packets in accordance with the configurable parameters.

In some cases, packet processing operations may be commonly applied to multiple packet flows that each requires the same operation according the same parameters. Such flows may each require additional packet processing operations that are distinct from those required by other the flows to which the same operation is to be applied. In other words, a set of multiple flows may have some packet processing operations applied by service node 12 in common, while other packet processing operations applied by service node 12 differ among the flows within the set. "Distinct," in this case, refers to those operations that are not to be commonly applied to all flows in the set of multiple packet flows. Subsets of the set of multiple packet flows may thus nevertheless have "distinct" operations in common, although such operations are not common to every flow in the set.

In accordance with techniques of this disclosure, service node 12 identifies a set of multiple packet flows to which common packet processing operations may be applied. Service node 12 additionally determines, for the group of multiple packet flows, distinct packet processing operations for the packet flows and associates each of the distinct operations with a variable value. Service node 12 further associates, in subscriber records for respective packet flows, the variable values with packet flows to which the corresponding distinct operations are to be applied. Each of the subscriber records for the set of multiple packet flows also specifies a common logical interface (IFL).

A common IFL of service node 12 defines common packet processing operations for the group and one or more variables in a packet processing template. The variables of the packet processing template represent a placeholder for variable values in subscriber records. Logical interfaces of service node 12 that interface to a packet processing template are referred to hereinafter as template IFLs. To map an additional packet flow to the template IFL previously defined for the group, service node 12 generates for the additional packet flow a new subscriber record that specifies variable values as well as the template IFL.

Upon receiving a packet associated with one of the group of multiple packet flows, service node 12 maps the packet to its associated packet flow, identifies the subscriber record for the associated packet flow, and processes the packet using the template IFL for the group of packet flows. To apply the distinct operations to the packet (i.e., those operations not common to the template IFL because common to all packet flows of the group), service node 12 looks up the variable values in the identified subscriber record. Each of the variable values specifies a distinct operation for application, which service node 12 applies to the packet.

As a result, service node 12 may process, using a single template IFL, packets for multiple packet flows that nevertheless require distinct operations. Each IFL of service node 12 may require management, hardware, and software resources that are inherently limited within service node 12. By overloading a IFL using a template IFL yet still providing subscriber- and/or flow-specific packet processing operations, the techniques increase the number of packet flows and/or subscribers that may be uniquely handled by service node 12. Moreover, because service node 12 may map new flows to previously defined template IFLs by simply generating appropriate subscriber records for the new flows, the techniques eliminate the requirement of creating new IFLs for every new flow and may thus decrease an average setup time required by service node 12 for new flows.

Figure 2:
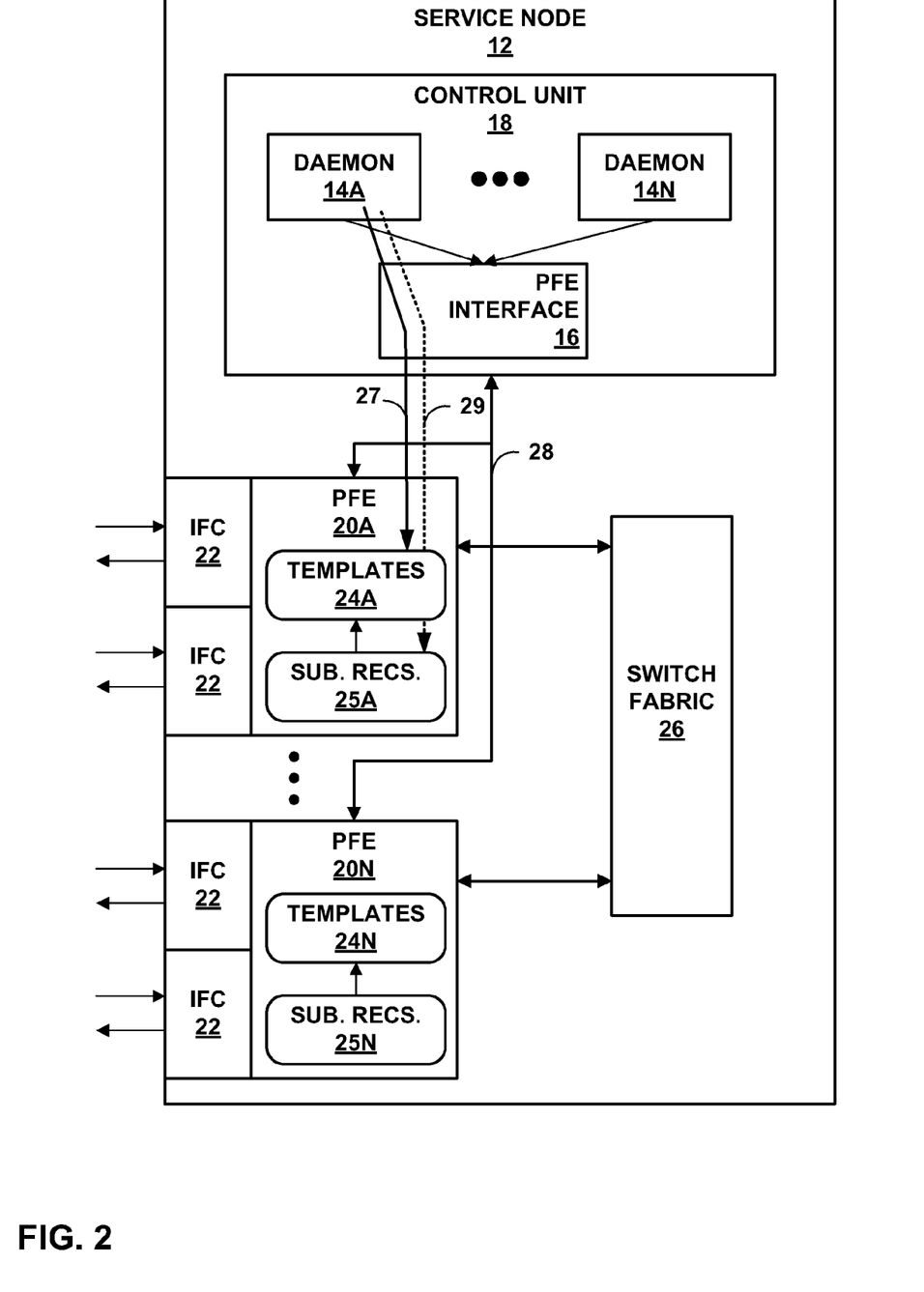
FIG. 2 is a block diagram illustrating an example service node that processes multiple subscriber packet flows with a template logical interface in accordance with the described techniques.

FIG. 2 is a block diagram illustrating an example service node 12 that processes multiple subscriber packet flows with a template logical interface in accordance with the described techniques. Service node 12 may comprise a router such as a provider edge or customer edge router, or another type of network device, such as a switch.

In this example, service node 12 includes a control unit 18 that provides control plane functionality for the device. Control unit 18 may be distributed among multiple entities, such as one or more routing units and one or more service cards insertable into a chassis. In such instances, service node 12 may therefore have multiple control planes. Service node 12 also includes a plurality of forwarding components in the form of example packet forwarding engines 20A-20N ("PFEs 20") and a switch fabric 26 that together provide a forwarding plane for forwarding and otherwise processing subscriber traffic. PFEs 20 receive and send data packets via interfaces of interface cards 22A-22N ("IFCs 22") each associated with a respective one of PFEs 20. Each of PFEs 20 and its associated ones of IFCs 22 may reside on a separate line card for service node 12 (not shown). Example line cards include flexible programmable integrated circuit (PIC) concentrators (PFCs), dense port concentrators (DPCs), and modular port concentrators (MPCs). Each of IFCs 22 may include interfaces for various combinations of layer two (L2) technologies, including Ethernet, Gigabit Ethernet (GigE), and Synchronous Optical Networking (SONET) interfaces. In various aspects, each of PFEs 30 may comprise more or fewer IFCs. Switch fabric 26 provides a high-speed interconnect for forwarding incoming data packets to the selected one of PFEs 20 for output over a network.

Control unit 18 is connected to each of PFEs 20 by internal communication link 28. Internal communication link 28 may comprise a 100 Mbps or 1 Gbps Ethernet connection, for instance. Daemons 14A-14N ("daemons 14") executed by control unit 18 are user-level processes that run network management software, execute routing protocols to communicate with peer routing devices, execute configuration commands received from an administrator, maintain and update one or more routing tables, manage subscriber flow processing, and create one or more forwarding tables for installation to PFEs 20, among other functions. One of daemons 14 may comprise a client for an AAA protocol, such as a RADIUS client.

Control unit 18 may include one or more processors (not shown in FIG. 1) that execute software instructions, such as those used to define a software or computer program, stored to a computer-readable storage medium (again, not shown in FIG. 1), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 18 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

PFEs 20 process packets by performing a series of operations on each packet over respective internal packet processing paths as the packets traverse the internal architecture of service node 12. Operations may be performed, for example, on each packet by any of a corresponding ingress interface, an ingress PFE 20, an anchor PFE 20, an egress PFE 20, an egress interface or other components of service node 12 to which the packet is directed prior, such as one or more service cards. PFEs 20 each include service objects that, when executed, examine the contents of each packet (or another packet property, e.g., incoming interface) and on that basis make forwarding decisions, apply filters, and/or perform accounting, management, traffic analysis, class of service decisions, lawful intercept, and load balancing, for example. In one example, each of PFEs 20 arranges service objects as next hop data that can be chained together as a series of "hops" along an internal packet processing path for the service node. The result of packet processing determines the manner in which a packet is forwarded or otherwise processed by PFEs 20 from its input interface on one of IFCs 22 to its output interface on one of IFCs 22. A particular packet may be processed by multiple PFEs 20.

PFE interface 16 presents an interface by which daemons 14 may allocate service objects of PFEs 20 to apply services to subscriber packet flows. In accordance with the described techniques, PFE interface 16 presents an interface by which daemons 14 arranges allocated service objects into a packet processing template IFL that specifies a number of variables that affect operation based on respective variable values for the packet flow being processed. Daemons 14 direct PFEs 20 via PFE interface 16 to install respective sets of packet processing template IFLs 24A-24N ("templates 24") with which PFEs 20 process subscriber packet flows. Each of PFEs 20 may include zero or more template IFLs. Templates 24A of PFE 20A may include zero or more template IFLs, for instance. PFE interface 16 may comprise one or more user- or kernel-level libraries, programs, toolkits, application programming interfaces (APIs) and may communicate control and data messages to PFEs 20 via internal communication link 28 using sockets.

For example, one of daemons 14 may execute a command line interface (CLI) that receives, from a user, a command to apply a lawful intercept function to a particular packet flow for a subscriber. As another example, one of daemons 14 may receive a subscriber profile that indicates that packet flows for the subscriber should receive a particular class of service. In response, daemons 14 invoke PFE interface 16 to apply the service to the packet flow. PFE interface 16 allocates the service in PFEs 20 and then directs PFEs 20 to generate or modify an IFL for the packet flow to include the service in a list of services to apply to packets in the packet flow.

In some cases, the service to be newly applied to a packet flow is also be applied by PFEs 20 to another packet flow and the service can therefore be commonly applied to both packet flows. In accordance with techniques described in this disclosure, daemons 14 via PFE interface 16 direct PFEs 20 to generate a new template for both packet flows to include the service as implemented, in part, by a service object, such as a filter, classifier, class of service queue, counter, policer, lawful intercept component, traffic flow template, routing table, or mobility tunnel endpoint identifier handler. In some instances, the multiple packet flows also require services that are distinct among the flows. In such instances, daemons 14 direct PFEs 20 to generate the new template to include a variable placeholder for the distinct services for the respective packet flows. PFEs 20 install the new template to templates 24.

In the illustrated example, daemon 14A directs PFEs 20 to install the new template to templates 24A using template IFL generation message 27. Template IFL generation message 27 includes a list of variables for application to the new template IFL. In some instances, template IFL generation message 27 attaches the included list of variables to an existing IFL to transform the existing IFL into a template IFL.

In addition, daemons 14 map packet flows to subscribers to the template IFL and generate respective subscriber records for the packet flows. A subscriber record is the set of unique attributes needed for each subscriber packet flow to uniquely identify and provide traffic treatment and accounting for that flow with a particular template IFL. A subscriber record specifies the template IFL of templates 24 with which to process packets belonging to the packet flow corresponding to the subscriber record. The subscriber record additionally specifies variable values for the list of variable applied by PFEs 20 to the specified template IFL of templates 24. Daemons 14 install, via PFE interface 16, newly generated or modified subscriber records to sets of subscriber records 25A-25N ("subscriber records 25") of PFEs 20. Each of subscriber records 25 may include zero or more subscriber records. In the illustrated example, daemon 14A downloads to subscriber records 25A of PFE 20A, with subscriber record creation message 29, a subscriber record to alter the execution of a specified template in templates 25A based on variable values of the subscriber record. Subscriber record creation message 29 includes the list of variable values for a corresponding packet flow and specifies the one of templates 25A with which to process packets for the packet flow. Subscriber record creation message 29 may further include an associated key structure that PFE 20A may use to map packets having matching packet properties to the subscriber record being created in subscriber records 25A. Packet properties matched may include, for example, packet metadata such as a particular packet's ingress interface or egress interface (as determined by the PFEs) as well as information carried by the packet and packet header, such as packet header fields, destination route prefixes, VLAN tags, layer four (L4) or Transport Layer protocol destination ports, tunnel header metadata (e.g., TEIDs), and the packet payload.

When service node 12 receives packets, PFEs 20 of the service node map the packets to one of subscriber records 25 of the PFEs. PFEs 20 may then process the packets using templates 24 according to subscriber records 25 for the packets that specify variable values for the templates. In this way, subscriber records 25 may affect the processing path of packets for multiple flows mapped to a single template in templates 24 with lists of variable values that may require substantially fewer resources than those required to create separate IFLs for each packet flow. As a result, the techniques may reduce the average number of resources to support any given packet flow and increase the number of flows supportable by service node 12.

Figure 3:
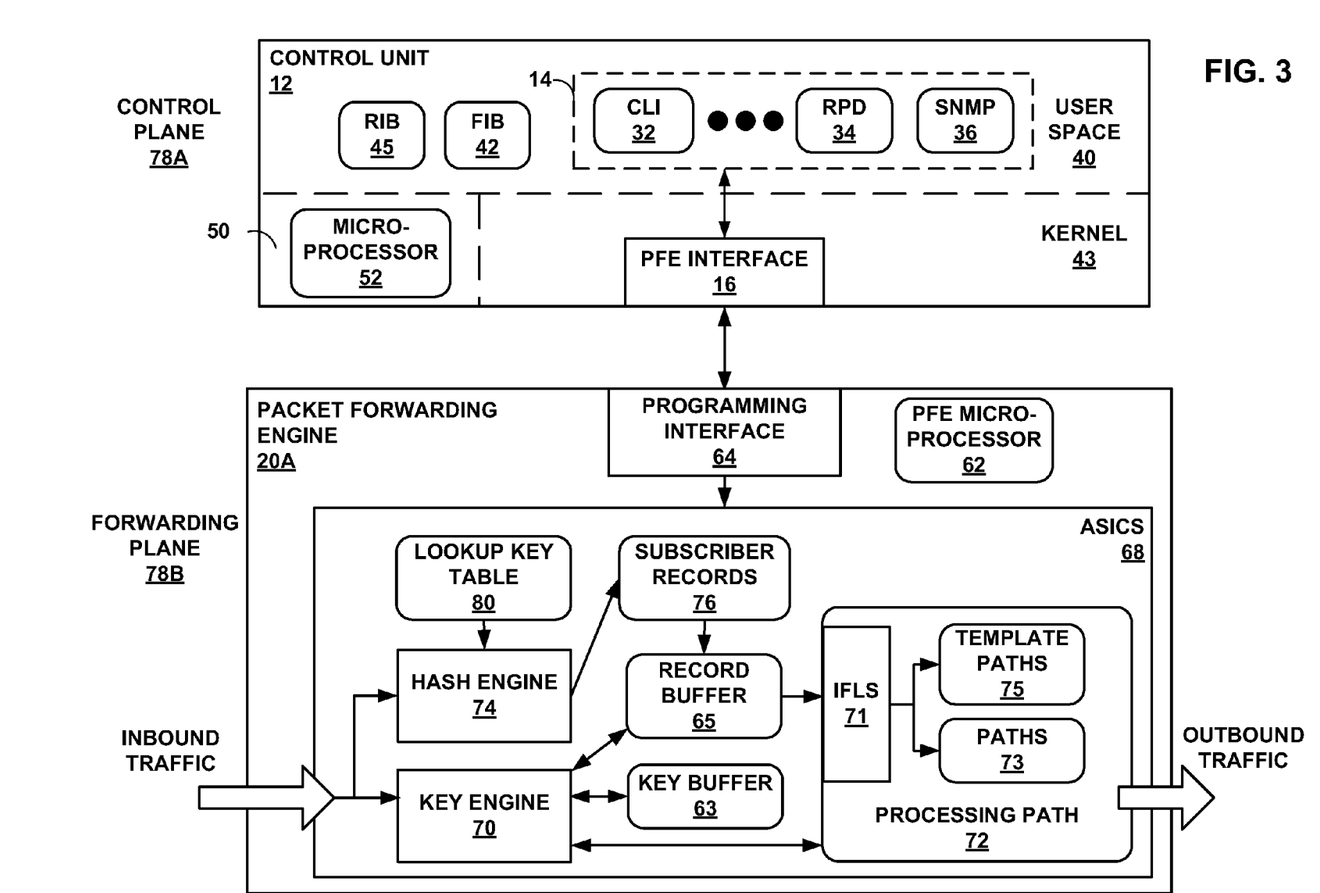
FIG. 3 is a block diagram illustrating example instances of a control unit and packet forwarding engine of the service node of FIG. 2 in further detail.

FIG. 3 is a block diagram illustrating example instances of control unit 12 and packet forwarding engine 20A ("PFE 20A") of PFEs 20 of FIG. 2 in further detail. In this example, control unit 12 provides a control plane 78A operating environment for execution of various user-level daemons 14 executing in user space 40. Daemons 14 in this example include command-line interface daemon 32 ("CLI 32"), routing protocol daemon 34 ("RPD 34"), and Simple Network Management Protocol daemon 36 ("SNMP 36"). In this respect, control plane 78A may provide routing plane, service plane, and management plane functionality for service node 12. Various instances of control unit 12 may include additional daemons 14 not shown in FIG. 2 that perform other control, management, or service plane functionality and/or drive and otherwise manage forwarding plane functionality for service node 12. Control unit 12 may in some instances represent a control unit of a service card or a combination of control units of a routing unit that provides routing plane functionality and a service card.

Daemons 14 operate over and interact with kernel 43, which provides a run-time operating environment for user-level processes. Kernel 43 may comprise, for example, a UNIX operating system derivative such as Linux or Berkeley Software Distribution (BSD). Kernel 43 offers libraries and drivers by which daemons 14 may interact with the underlying system. PFE interface 16 of kernel 43 comprises a kernel-level library by which daemons 14 and other user-level processes or user-level libraries may interact with programming interface 64 of PFE 20A. PFE interface 16 may include, for example, a sockets library for communicating with PFE 20A over dedicated network links.

Hardware environment 50 of control unit 12 comprises microprocessor 52 that executes program instructions loaded into a main memory (not shown in FIG. 3) from storage (also not shown in FIG. 3) in order to execute the software stack, including both kernel 43 and user space 40, of control unit 12. Microprocessor 52 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 34 executes one or more interior and/or exterior routing protocols to exchange routing information with other network devices and store received routing information in routing information base 45 ("RIB 45"). RIB 45 may include information defining a topology of a network, including one or more routing tables and/or link-state databases. RPD 34 resolves the topology defined by routing information in RIB 45 to select or determine one or more active routes through the network and then installs these routes to forwarding information base 42 ("FIB 42"). Typically, RPD 34 generates FIB 42 in the form of a radix or other lookup tree to map packet information (e.g., header information having destination information and/or a label stack) to next hops and ultimately to interface ports of interface cards associated with respective PFEs 20.

Command line interface daemon 32 ("CLI 32") provides a shell by which an administrator or other management entity may modify the configuration of service node 12 using text-based commands. Simple Network Management Protocol daemon 36 ("SNMP 36") comprises an SNMP agent that receives SNMP commands from a management entity to set and retrieve configuration and management information for service node 12. Using CLI 32 and SNMP 36, for example, management entities may enable/disable and configure services, manage classifications and class of service for packet flows, install routes, enable/disable and configure rate limiters, configure traffic bearers for mobile networks, and configure interfaces, for example. RPD 34, CLI 32, and SNMP 36 in this example configure forwarding plane 78B via PFE interface 16 to implement configured services, add/modify/delete routes, add subscriber records, add hash keys, and modify packet processing paths by installing service objects to PFEs 20.

PFE interface 16 allows daemons 14 to drive the installation and configuration of packet processing path 72 of PFE 20A. In particular, PFE interface 16 includes an application programming interface (API) by which daemons 14 may request allocation of a service component (e.g., a counter or policer) of processing path 72 and receive an identifier for the requested service component, arrange service components into template processing paths 75 ("template paths 75") and standard processing paths 73 ("paths 73"), install subscriber records, and map packet flows to subscriber records and logical interfaces for processing.

PFE 20A, in combination with other PFEs 20 of service node 12, implements forwarding plane 78B (also known as a "data plane") functionality to handle packet processing from ingress interfaces on which packets are received to egress interfaces to which packets are sent. Forwarding plane 78B determines data packet forwarding through service node 12, applies services, rate limits packet flows, filters packets, and otherwise processes the packets using service objects and lookup data installed by control plane 78A to forwarding plane 78B. While FIG. 3 illustrates only PFE 20A in detail, each of PFEs 20 of service node 12 comprises similar modules that perform substantially similar functionality.

PFE 20A includes ASIC-based packet processors ("ASICs 68") that map packets to subscriber records and execute processing path 72 in accordance with techniques described herein. ASICs 68 include one or more programmable application-specific integrated circuits having key engine 70 that executes microcode (or "microinstructions") to control and apply fixed hardware components of ASICs 68 to process packet "keys." A packet key includes packet fields and other parameters that determine a flow of packet processing for the packet along an internal processing path, such as template paths 75 and paths 73. Key engine 70 includes key buffer 63 to store packet field data for corresponding packets that the key engine is currently processing. Key buffer 63 may also provide limited writable memory to which elements of the internal processing path may write to pass messages accessible by future elements. Some instances of ASICs 68 may include a plurality of key engines each having an associated key buffer and record buffer.

Internal processing path 72 ("processing path 72") of ASICs 68 comprises programmable, executable microcode and fixed hardware components that determine the packet processing actions and other operations performed by key engine 70. Processing path 72 may include service objects in the form of, for example, executable instructions, programmable logic, and application-specific logic that perform lookups, rate limit packet flows, count packets, implement classes of service, perform lawful intercept, classify packets, apply filters, route packets, and manipulate packet keys, among other functions. PFE 20A may store executable instructions of processing path 72 in computer-readable storage media, such as static random access memory (SRAM). While illustrated within ASICs 68, executable instructions of processing path 72 may be stored in memory external to ASICs 68 onboard PFE 20A. PFE 20A also stores additional illustrated data structures, such as lookup key table 80, subscriber records 76, record buffer 65, and key buffer 63, in computer-readable storage media, such as internal or external SRAM.

In some aspects, one or more service objects of processing path 72 comprise a next hop data structure to initiate processing. At the end of each processing step by key engine 70, the result is a next hop that may specify additional processing or the termination of processing, for instance. In addition, next hops may specify one or more functions to be executed by key engine 70 and/or one or more hardware elements to be applied (e.g., policers). Next hops thus form the primary data structure that can be used to initiate a service, chain next hops to allow for multiple services to be performed on a single packet, and terminate an internal processing path. Key engine 70 may be associated with a result (or "lookup") buffer that stores results for executing next hops. For example, key engine 70 may execute a lookup specified by a next hop and store the result of the lookup to the associated result buffer. The contents of a result buffer may affect the actions of the next hop in the next hop chain.

Logical interfaces 71 ("IFLs 71") is a table or other data structure that includes one or more logical interfaces that each determines services commonly applied to a group of subscribers. The number of IFLs 71 may be limited in various implementations of PFE 20A due to memory restrictions, the rate at which PFE microprocessor 62 can establish paths in processing path 72, the bandwidth between control unit 12 and PFE 20A, and the rate at which control unit 12 can allocate service objects and determine paths in processing path 72. Each of IFLs 71 is an interface to a processing path in either template paths 75 or paths 73. Paths 73 represents one or more processing paths for execution by key engine 70 on key buffer 63. In accordance with techniques of this disclosure, template paths 75 includes one or more processing paths, for execution by key engine 70 on key buffer 63, that each include one or more variables that resolve to a variable value in record buffer 65 to determine a next service object for execution. Respective IFLs 71 that map to template paths 75 and paths 73 are alternatively referred to herein as template IFLs and standard IFLs, respectively.

Subscriber records 76 may represent an example embodiment of subscriber records 25A of FIG. 2. Each of subscriber records 76 contains information required by PFE 20A to process packets of a subscriber packet flow. That is, subscriber records 76 describe the treatment of subscribers by PFE 20A. Each of subscriber records 76 specifies one of IFLs 71 with which to process packets mapped to the subscriber record. Subscriber records that specify a template IFL also include one or more variable values that specify service objects for corresponding variables in the one of template paths 75 for which the template IFL is an interface. Subscriber records 76 may store variable values using an index table that maps table entry indices to a particular value. For example, a variable value in the first entry of a table for a subscriber record may be a value for index 0 of the subscriber record. Alternatively, subscriber records may store variables and corresponding values as associative data pairs that each maps a variable name to a corresponding value. As described in detail below, each of subscriber records 76 may also include a lookup key.

PFE microprocessor 62 manages ASICs 68 and executes programming interface 64 to provide an interface for/to control unit 12. PFE microprocessor 62 may execute a microkernel to provide an operating environment for interfaces. Programming interface 64 receives messages from control unit 12 directing packet forwarding engine 20A to configure logical interfaces 72, template paths 75, and paths 73 of processing path 72.

Daemons 14 via PFE interface 16 may direct programming interface 64 to allocate a service object (e.g., a counter) in processing path 72 for application to packets for a particular flow. Programming interface 64 returns a reference to the service object that daemons 14 may then bind to the flow and, in some cases, the associated subscriber using subscriber records 72. Daemons 14 generate a service descriptor for the reference and add the service descriptor to a subscriber record for the flow as a variable value to associate the service provided by the service object with the subscriber record. In addition, daemons 14 insert a variable placeholder into one of template paths 75 for a template IFL specified by the subscriber record. The variable placeholder directs forwarding plane 78B to correlate the variable with a service descriptor for the variable in the subscriber record during packet processing. In this way, daemons 14 specify, using the service descriptor, the location of the service object in the subscriber record to ensure that forwarding plane 78B applies the service object to packets mapped to the subscriber record. By allocating different service objects for different subscriber flows and adding respective service descriptors for the service objects to respective subscriber records for the subscriber flows, control plane 78A differentiates processing, by forwarding plane 78B executing a single one of template paths 75, of packets for multiple different subscriber flows. In some instances, PFE interface 16 manages aspects of service object allocation and IFL and subscriber record generation on behalf of daemons 14 using a kernel library or user library, for example.

In some cases, daemons 14 add service descriptors for static service objects to template paths 75 such that key engine 70 of forwarding plane 78B always executes static service objects to packets processed using the templates. In other words, the static service object applies a service that is common among all subscriber flows mapped to the template. In some cases, daemons 14 may insert a variable placeholder into template paths 75 that specifies a default service descriptor for the variable. During processing of packets for a packet flow, key engine 70 of forwarding plane 78B applies the service object specified by the default service descriptor when a corresponding variable value for the variable is not specified in the one of subscriber records 72 for the packet flow.

A reference to a service object provided by programming interface 64 to daemons 14 may comprise, for example, a global resource index, an index locally managed by PFE 20A, a combination of an index to a bank of service objects and an offset to a particular service object within the bank, a memory pointer to, e.g., a next hop, or a data value. A service descriptor may comprise a pointer, index, or a variable name that resolves to a variable value in record buffer 65, for example. In some instances a service descriptors may additionally or alternatively comprise an index or global identifier for a service object.

Service node 12 maps incoming subscriber traffic to one of subscriber records 76 to identify the logical interface of IFLs 71 with which to process the traffic. Service node 12 may terminate a number of different types of subscriber connections that subscribers use to access a network through the service node. For example, service node 12 may terminate Internet Protocol (IPv4 or IPv6) network connections, single- or double-tagged VLAN attachments, GPRS and/or LTE network tunnels for a mobile subscriber, PPPoE connections, and/or mobile IP tunnels. A subscriber connection is associated with an upstream packet flow and a downstream packet flow, and a particular subscriber (e.g. a campus or enterprise network, or a mobile phone) device may be association with multiple subscriber connections. Each of these termination models requires a different lookup key with which to identify subscriber packets for the subscriber connections. Lookup key table 80 includes one or more lookup keys that specify packet parameters, the values for which uniquely identify the packet as belonging to a particular packet flow for a subscriber that connects to service node 12 according to a termination model. For example, lookup key table 80 may include an entry that specifies a Gateway GPRS Support Node (GGSN) subscriber $G_n$ interface lookup key that specifies a TEID for $G_n$ interface GTP tunnels for subscriber connections carried by a GPRS network.

In the illustrated embodiment, hash engine 74 of ASICs 68 executes a hash function to generate a hash value from packet parameters according to a termination model lookup key defined in lookup key table 80 for the subscriber connection type. The hash function executed by hash engine 74 may be SHA-1, MD5, or another one-way function that generates a hash value from one or more parameter values. Each of subscriber records 76 in this embodiment stores a subscriber record lookup key having packet parameter values corresponding to lookup key in the termination model lookup key table 80 for the subscriber connection type for the subscriber record. Hash engine 74 uses the hash value to determine a subscriber record index to one of subscriber records 76 stored in memory. If the lookup key of the subscriber record in subscriber records 76 referenced by the subscriber record index matches the lookup key of the packet, hash engine 74 loads (or directs key engine 70 to load) the keyed-to subscriber record to record buffer 65 associated with key engine 70. Record buffer 65 stores the subscriber record, including each of the variable values, for the packet being processed by key engine 70. In this way, key engine 70 may carry the variable values along a template path being executed. The keyed-to subscriber record also specifies one of IFLs 71, which key engine 70 then executes to process key buffer 63. The operations of hash engine 74 are one example of steps for associating a subscriber packet with a subscriber record. Other methods may be performed by PFE 20A components to associate subscriber packets with respective subscriber records, including simple matching of a packet lookup key with respective lookup keys of subscriber records 76.

When executing one of template paths 75 for a template IFL, key engine 70 resolves the variables of the template path to the service objects specified by variable values of one of subscriber records 76. If the subscriber record does not specify a variable value for the variable, key engine 70 may instead execute a default service descriptor for the variable or, if no such default service descriptor is specified for the variable in the template path, execute a nop instruction (i.e., no operation) for the variable, and proceed to execute the remaining service objects of the template path.

In the illustrated embodiment, key engine 70 resolves the variables to a value in the subscriber record temporarily stored by record buffer 65. For example, a variable of a template path may specify index 0. To resolve the variable, key engine 70 reads the service descriptor specified by index 0 of the subscriber record stored by record buffer 65. To process packets for another packet flow using the same template path, hash engine 74 keys to and loads the subscriber record in subscriber records 76 for the packet flow to record buffer 65. Key engine 70 resolves the variables of the template path to the service descriptors that specify distinct services for the packet flow and applies the service objects pointed to by the service descriptors. In this way, forwarding plane 78B may process multiple different packet flows using a single template processing path and a different subscriber record for each of the packet flows.

Figure 4:
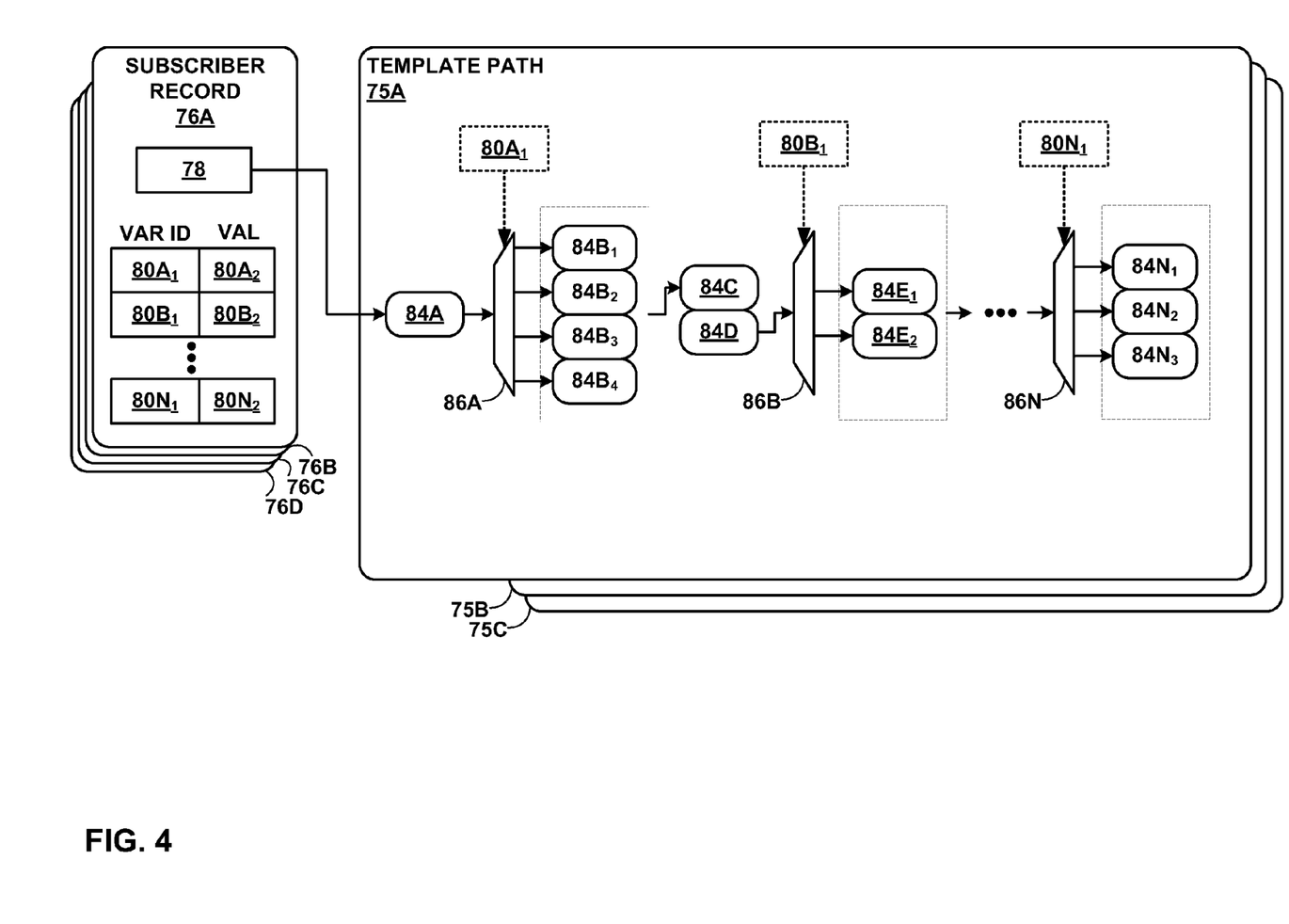
FIG. 4 is a block diagram illustrating example template paths and subscriber records that conform to techniques described in this disclosure.

FIG. 4 is a block diagram illustrating example template paths 75A-75C and subscriber records 76A-76D that conform to techniques described in this disclosure. Example template path 75A and subscriber record 76A are illustrated in detail.

Subscriber records 76 specify an IFL for a internal packet processing path, such as one of template paths. For example, subscriber record 76A includes IFL 78, a data value that specifies an IFL for template path 75A. Subscriber records 76 each may additionally include a collection of variable identifiers-variable value associative pairs ("variable pairs") that specify variable values for template paths variables identified using the variable identifiers. Subscriber record 76A includes variable pairs 80A-80N. In some instances, subscriber records 76 may include a reference to an additional subscriber record to increase the number of variable pairs available for the packet flow.

Template path 75A includes a plurality of service objects 84A-84N ("service objects") that each implements a service for application to a packet upon execution of the template path by the forwarding plane. In accordance with techniques described herein, some of service objects 84 represent a group of service objects selectable by resolving one of variables 86A-86N ("variables 86") to a variable value in one of subscriber records 76. Each of variables 86 is identified by a corresponding variable identifier. For example, service objects $84B_1$-$84B_4$ ("service objects 84B") are a group of service objects. Service objects 84B may each represent, for example, a different counter in a bank of counters, a different queue in a set of class of service queues, different filters or policers, or different next hops for handling mobility tunnels for different packet flows. Any of a group of service objects may be referenced by a variable value in subscriber record 76A for variable 86A identified by variable identifier $80A_1$. By resolving the variable to a variable value in subscriber record 76A for variable 86A, i.e., to variable value $80A_2$ for variable identifier $80A_1$, the forwarding plane determines the one of the group of service objects to apply to packets belonging to the packet flow corresponding to subscriber record 76A. Some of service objects 84, e.g., service objects 84A, 84C, and 84D are commonly applied to each packet flow mapped via one of subscriber records 76 to template path 75A.

Each of variables 86 may be a variable instruction or group of instructions that, when executed, resolve to a value for the variable. The value for a variable may itself represent an instruction or group of instructions in the form of a service descriptor that is a memory pointer to a service object. For example, in subscriber record 76A, value $80A_2$ for variable identifier $80A_1$ of variable 86A may specify service object $84B_2$. Subscriber records 76B-76D may additionally specify template path 75A and may include different values for variable identifier $80A_1$ in order to specify distinct service objects in the group of service objects $84B_1$-$84B_4$. As a result, the forwarding plane executing template path 75A for a packet uses subscriber records 76 to alter the processing path within template path 75A based on the packet flow to which the packet belongs.

Figure 5:
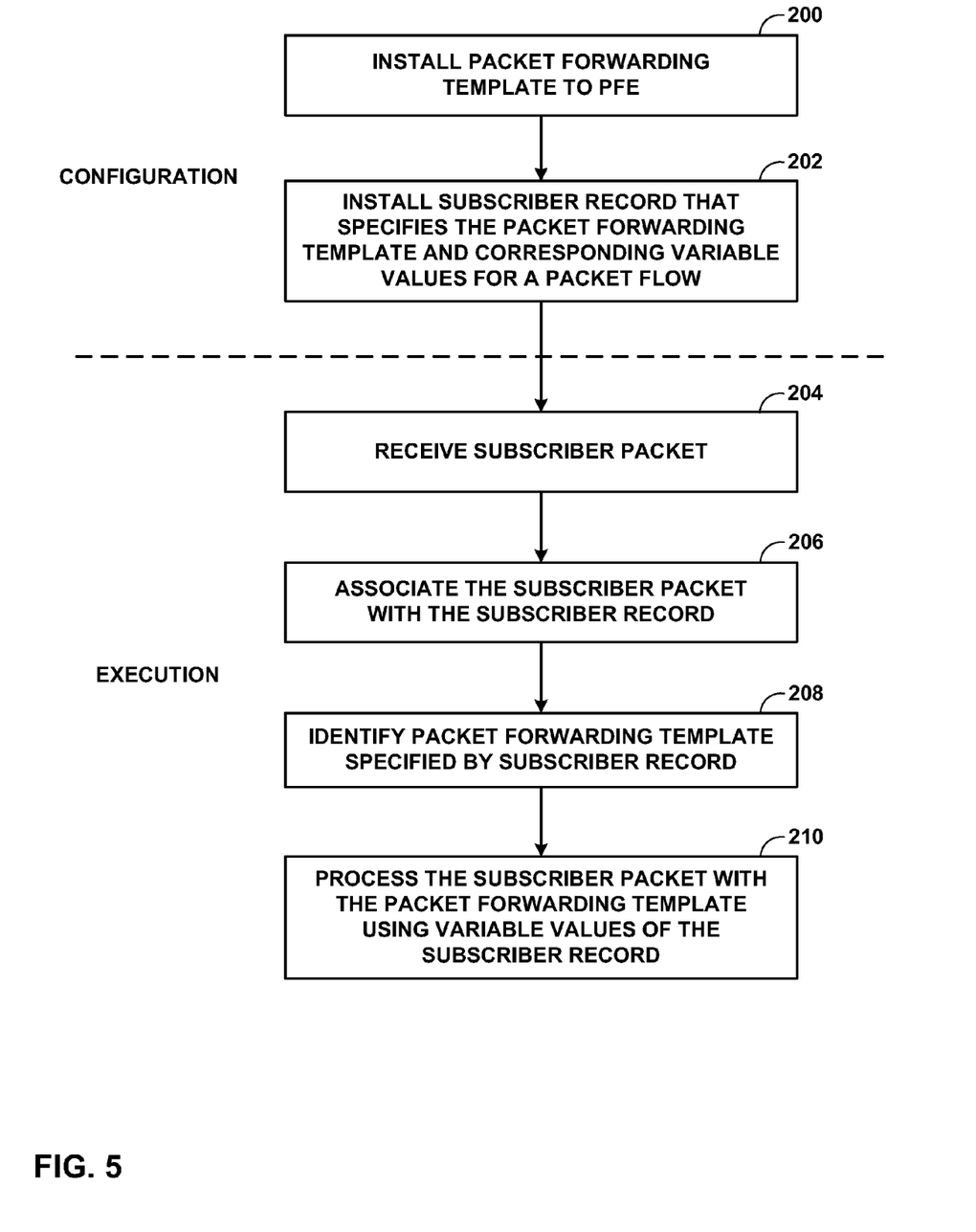
FIG. 5 is a flow chart illustrating an example mode of operation of the service node of FIG. 2 to process packets using a variable-based processing path.

FIG. 5 is a flow chart illustrating an example mode of operation of service node 12 of FIG. 2 to process packets using a variable-based processing path. During a configuration phase for a packet flow, which may occur during operation of service node 12 to apply services to packets, daemons 14 install a packet forwarding template via PFE interface 16 to templates 24A of PFE 20A (200). The packet forwarding template may specify service objects for application by PFE 20A and further specifies variables. In addition, daemons 14 generate and install a subscriber record for the packet flow to subscriber records 25A of PFE 20A (202). The subscriber record specifies the packet forwarding template and may also specify variable values for the packet forwarding template variables.

Upon receiving a subscriber packet on one of interface cards 22 (204), PFE 20A associates the subscriber packet with the subscriber record installed to subscriber records 25A (206). PFE 20A determines from the subscriber record the specified logical interface (IFL), which in this example is a template IFL for the packet forwarding template (208). PFE 20A processes the packet using the packet forwarding template using variable values of the subscriber record for corresponding variables of the packet forwarding template (210).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:
1. A method comprising:
installing, to an integrated circuit of a network device forwarding plane, a packet processing template that defines a plurality of internal execution paths within the integrated circuit for processing a plurality of packet flows mapped to the packet processing template, each of the plurality of internal execution paths including a common service object and one or more distinct service objects respectively representing corresponding hardware of the integrated circuit and chained together as a series of next hop operations applied by the integrated circuit,
wherein different values for a variable of the packet processing template determine, at least in part, the internal execution paths of the plurality of internal execution paths for processing different packet flows of the plurality of packet flows;
installing, to the network device forwarding plane, a first subscriber record for a first packet flow of the plurality of packet flows, wherein the first subscriber record includes a first variable value for the variable that identifies a first internal execution path of the plurality of internal execution paths;
in response to receiving a first packet associated with the first packet flow, determining, by the integrated circuit of the network device forwarding plane based at least in part on the first subscriber record, the first variable value of the first subscriber record for the first packet flow; and
in response to determining the first variable value identifies the first internal execution path of the plurality of execution paths, processing, by the integrated circuit of the network device forwarding plane, the first packet using the first internal execution path of the plurality of internal execution paths.
2. The method of claim 1, wherein the first variable value specifies a first service object of the one or more distinct service objects of the first internal execution path, the method further comprising:
determining the first variable value of the first subscriber record; and
responsive to determining the first variable value, applying the first service object to the first packet.
3. The method of claim 1, further comprising:
installing, to the network device forwarding plane, a second subscriber record for a second packet flow of the plurality of packets flows, wherein the second subscriber record includes a second variable value for the variable that identifies a second internal execution path of the plurality of internal execution paths;
in response to receiving, with the network device, a second packet associated with the second packet flow, determining, by the integrated circuit of the network device forwarding plane based at least in part on the second subscriber record, the second variable value of the second subscriber record for the second packet flow;
in response to determining the second variable value identifies the second internal execution path of the plurality of execution paths, processing, by the integrated circuit of the network device forwarding plane, the second packet using the second internal execution path of the plurality of internal execution paths.
4. The method of claim 1, further comprising:
allocating a service object in the integrated circuit of the network device forwarding plane, wherein the service object comprises one of the one or more distinct service objects of the first internal execution path of the plurality of execution paths; and
adding a service descriptor for the service object to the first subscriber record as the first variable value,
wherein processing the first packet using the first internal execution path of the plurality of execution paths comprises:
determining the first variable value for the first subscriber record to identify the service descriptor;
resolving the service descriptor to the service object; and
executing the service object to apply a first service to the first packet.
5. The method of claim 4, wherein the service object is selected from the group consisting of a filter, classifier, class of service queue, counter, policer, lawful intercept component, traffic flow template, routing table, or mobility tunnel endpoint identifier handler.
6. The method of claim 1, wherein processing the first packet using the first internal execution path of the plurality of execution paths comprises applying, by the integrated circuit of the network device forwarding plane, the common service to the first packet.
7. The method of claim 1, further comprising:
setting a default service object for the variable in the packet processing template, the default service object representing a hardware of the integrated circuit;
installing, to the network device forwarding plane, a second subscriber record for a second packet flow that is different than the first packet flow;
receiving a second packet associated with the second packet flow;
applying, by the integrated circuit of the network device forwarding plane, a second service object to the second packet if the second subscriber record specifies a second variable value for the variable that specifies the second service object, the second service object representing a hardware of the integrated circuit; and
applying the default service object to the second packet only if second subscriber record does not specify a second variable value for the variable.

8. The method of claim 1, further comprising:
installing, to the network device forwarding plane, a second subscriber record for a second packet flow that is different than the first packet flow;
receiving a second packet associated with the second packet flow;
applying, by the integrated circuit of the network device forwarding plane, a second service object to the second packet if the second subscriber record specifies a second variable value for the variable that specifies the second service object, the second service object representing a hardware of the integrated circuit; and
applying no operation to the second packet for the variable if the second subscriber record does not specify a second variable value for the variable.

9. The method of claim 1, wherein the first subscriber record specifies the packet processing template.

10. The method of claim 1, further comprising:
associating the packet processing template with a logical interface that determines a common set of services for the plurality of packet flows mapped to the logical interface; and
specifying the logical interface in the first subscriber record.

11. The method of claim 10, further comprising:
installing, to the network device forwarding plane, a second subscriber record for a second packet flow of the plurality of packet flows; and
specifying the logical interface in the second subscriber record.

12. The method of claim 1, further comprising:
adding, to the first subscriber record, a subscriber record lookup key that uniquely identifies the first subscriber record;
applying a hash function to the first packet to generate a hash index, wherein the hash index references the first subscriber record; and
matching the subscriber record lookup key to the first packet to associate the first subscriber record with the first packet.

13. The method of claim 12, further comprising:
adding, to the network device forwarding plane, a subscriber termination model lookup key that specifies one or more packet parameters, wherein values for the packet parameters uniquely identify a packet flow for a subscriber termination model; and
applying the hash function to values of the first packet for the packet parameters, wherein the network device receives the first packet in a subscriber connection that conforms to the subscriber termination model.

14. The method of claim 1, further comprising:
storing first subscriber record data to a record buffer of the forwarding plane; and
processing the first packet with the packet processing template using the first subscriber record data.

15. The method of claim 1, further comprising:
identifying, with a control plane of the network device, a common service for application to multiple packet flows;
generating the packet processing template with the control plane to include the common service object for the common service;
installing, with the control plane, the packet processing template to the forwarding plane.

16. The method of claim 1, further comprising:
generating the first subscriber record with the control plane;

sending the first subscriber record from the control plane to the network device forwarding plane.

17. A network device comprising:
an interface card;
a control unit comprising one or more processors; and
an integrated circuit associated with the interface card, the integrated circuit comprising:
a key engine;
a packet processing template that defines a plurality of internal execution paths within the integrated circuit for processing a plurality of packet flows mapped to the packet processing template, each of the plurality of internal execution paths including a common service object and one or more distinct service objects respectively representing corresponding hardware of the integrated circuit and chained together as a series of next hop operations applied by the integrated circuit,
wherein different values for a variable of the packet processing template determine, at least in part, the internal execution paths of the plurality of internal execution paths for processing different packet flows of the plurality of packet flows; and
a first subscriber record for a first packet flow of the plurality of packet flows, wherein the first subscriber record includes a first variable value for the variable that identifies a first internal execution path of the plurality of internal execution paths,
wherein the interface card receives a first packet associated the first packet flow, and
wherein the key engine, in response to receiving the first packet and based at least in part on the first subscriber record, determines the first variable value of the first subscriber record for the first packet flow, and
wherein the key engine, in response to determining the first variable value identifies the first internal execution path of the plurality of execution paths, processes the first packet using the first internal execution path of the plurality of internal execution paths.

18. The network device of claim 17,
wherein the first variable value specifies a first service object of the one or more distinct service objects of the first internal execution path,
wherein the key engine determines the first variable value of the first subscriber record and, responsive to determining the first variable value, applies the first service object to the first packet.

19. The network device of claim 17,
wherein the forwarding component further comprises a second subscriber record for a second packet flow of the plurality of packets flows, wherein the second subscriber record includes a second variable value for the variable that identifies a second internal execution path of the plurality of internal execution paths,
wherein the interface card receives a second packet associated with the second packet flow,
wherein the key engine determines, based at least in part on the second subscriber record, the second variable value of the second subscriber record for the second packet flow, and
wherein the key engine, in response to determining the second variable value identifies the second internal execution path of the plurality of execution paths, processes the second packet using the second internal execution path of the plurality of internal execution paths.

20. The network device of claim 17, further comprising:

a daemon executed by the processors that manages subscriber services for the network device; and
a forwarding component interface executed by the processors,
wherein the daemon invokes the forwarding component interface to allocate a service object in the integrated circuit, wherein the service object comprises one of the one or more distinct service objects of the first internal execution path of the plurality of execution paths,
wherein the daemon generates the first subscriber record by adding a service descriptor for the service object to the first subscriber record as the first variable value,
wherein the daemon invokes the forwarding component interface to send the subscriber record to the forwarding component,
wherein the key engine, to execute the packet processing template, determines the first variable value for the first subscriber record to identify the service descriptor, resolves the service descriptor to the service object, and executes the service object to apply a first service to the first packet.

21. The network device of claim 17, wherein the service object is selected from the group consisting of a filter, classifier, class of service queue, counter, policer, lawful intercept component, traffic flow template, routing table, or mobility tunnel endpoint identifier handler.

22. The network device of claim 17, wherein the first subscriber record specifies the packet processing template.

23. The network device of claim 17, further comprising:
a logical interface of the integrated circuit that determines a common set of services for the plurality of packet flows mapped to the logical interface and is associated with the packet processing template,
wherein the first subscriber record specifies the logical interface.

24. The network device of claim 23,
wherein the integrated circuit further comprises a second subscriber record that includes a second variable value for the variable that specifies a second service object, and
wherein the second subscriber record specifies the logical interface.

25. The network device of claim 17, further comprising:
a subscriber record lookup key of the first subscriber record that uniquely identifies the first subscriber record; and
a hash engine that applies a hash function to the first packet to generate an index, wherein the hash index references the first subscriber record, and wherine the hash engine matches the subscriber record lookup key to the first packet to associate the first subscriber record with the first packet.

26. The network device of claim 25, further comprising:
a subscriber interface for a subscriber connection that conforms to a subscriber termination model; and
a lookup key table that includes a subscriber termination model lookup key that specifies one or more packet parameters, wherein values for the packet parameters uniquely identify a packet flow for the subscriber termination model,
wherein the interface card receives the first packet in the subscriber connection, and
wherein the hash engine applies the hash function to values of the first packet for the packet parameters.

27. The network device of claim 17, further comprising:
a record buffer of the integrated circuit that stores first subscriber record data while the key engine processes the first packet,
wherein the key engine processes the first packet with the packet processing template using the first subscriber record data.

28. The network device of claim 17, further comprising:
a daemon executed by the processors that manages subscriber services for the network device,
a forwarding component interface to the integrated circuit executed by the processors,
wherein the daemon identifies a common service for application to multiple packet flows, generates the packet processing template to include the common service object of the integrated circuit for the common service, and invokes the forwarding component interface to install the packet processing template to the forwarding component.

29. The network device of claim 17, further comprising:
a daemon executed by the processors that manages subscriber services for the network device,
a forwarding component interface to the integrated circuit executed by the processors,
wherein the daemon generates the first subscriber record and invokes the forwarding component interface to send the first subscriber record to the integrated circuit.

30. A non-transitory computer-readable medium comprising instructions for causing one or more programmable processors and an integrated circuit of a network device forward plane to:
install, to the integrated circuit of a network device forwarding plane, a packet processing template that defines a plurality of internal execution paths within the integrated circuit for processing a plurality of packet flows mapped to the packet processing template, each of the plurality of internal execution paths including a common service object and one or more distinct service objects respectively representing corresponding hardware of the integrated circuit and chained together as a series of next hop operations applied by the integrated circuit,
wherein different values for a variable of the packet processing template determine, at least in part, the internal execution paths of the plurality of internal execution paths for processing different packet flows of the plurality of packet flows;
install, to the network device forwarding plane, a first subscriber record for a first packet flow of the plurality of packet flows, wherein the first subscriber record includes a first variable value for the variable that identifies a first internal execution path of the plurality of internal execution paths;
in response to receiving a first packet associated with the first packet flow, determine, by the integrated circuit of the network device forwarding plane based at least in part on the first subscriber record, the first variable value of the first subscriber record for the first packet flow; and
in response to determining the first variable value identifies the first internal execution path of the plurality of execution paths, process, by the integrated circuit of the network device forwarding plane, the first packet using the first internal execution path of the plurality of internal execution paths.

31. The non-transitory computer-readable medium of claim 30, wherein the first variable value specifies a first service object of the one or more distinct service objects of the first internal execution path, and wherein the instructions further cause the integrated circuit to:
determine the first variable value of the first subscriber record; and responsive to determining the first variable value, apply the first service object to the first packet.

32. The non-transitory computer-readable medium of claim 31, wherein the instructions further cause the one or more programmable processors and the integrated circuit of the network device forward plane to:
  install, to the network device forwarding plane, a second subscriber record for a second packet flow of the plurality of packets flows, wherein the second subscriber record includes a second variable value for the variable that identifies a second internal execution path of the plurality of internal execution paths;
  in response to receiving, with the network device, a second packet associated with the second packet flow, determine, by the integrated circuit of the network device forwarding plane based at least in part on the second subscriber record, the second variable value of the second subscriber record for the second packet flow;
  in response to determining the second variable value identifies the second internal execution path of the plurality of execution paths, processing, by the integrated circuit of the network device forwarding plane, the second packet using the second internal execution path of the plurality of internal execution paths.

* * * * *